(12) United States Patent
Tholen et al.

(10) Patent No.: US 8,651,497 B2
(45) Date of Patent: Feb. 18, 2014

(54) WINGED W-SEAL

(75) Inventors: Susan M. Tholen, Kennebunk, ME (US); Paul M. Lutjen, Kennebunkport, ME (US)

(73) Assignee: United Technologies Corporation, Hartford, CT (US)

( * ) Notice: Subject to any disclaimer, the term of this patent is extended or adjusted under 35 U.S.C. 154(b) by 432 days.

(21) Appl. No.: 13/162,923

(22) Filed: Jun. 17, 2011

(65) Prior Publication Data
US 2012/0319362 A1 Dec. 20, 2012

(51) Int. Cl.
*F16J 15/02* (2006.01)
(52) U.S. Cl.
USPC .......................................................... 277/644
(58) Field of Classification Search
USPC ......... 277/644, 603, 609, 630, 637, 648, 649, 277/654
See application file for complete search history.

(56) References Cited

U.S. PATENT DOCUMENTS

| | | | |
|---|---|---|---|
| 3,869,132 A * | 3/1975 | Taylor et al. | 277/608 |
| 4,381,114 A * | 4/1983 | Vanderford, Jr. | 277/322 |
| 5,154,577 A | 10/1992 | Kellock et al. | |
| 5,354,072 A * | 10/1994 | Nicholson | 277/647 |
| 5,558,347 A * | 9/1996 | Nicholson | 277/652 |
| 6,076,835 A | 6/2000 | Ress et al. | |
| 6,860,719 B2 | 3/2005 | Burdgick | |
| 6,893,217 B2 | 5/2005 | Brainch et al. | |
| 7,090,459 B2 | 8/2006 | Bhate et al. | |
| 7,101,147 B2 | 9/2006 | Balsdon | |
| 7,172,388 B2 | 2/2007 | Synnott | |
| 7,316,762 B2 * | 1/2008 | Lah | 202/242 |
| 7,874,792 B2 | 1/2011 | Tholen et al. | |
| 2009/0104025 A1 | 4/2009 | Lutjen et al. | |
| 2009/0243228 A1 | 10/2009 | Heinemann et al. | |
| 2011/0016689 A1 | 1/2011 | Thompson et al. | |

FOREIGN PATENT DOCUMENTS

| | | | |
|---|---|---|---|
| EP | 2 278 125 A2 | 1/2011 | |
| GB | 2303888 A * | 3/1997 | |

OTHER PUBLICATIONS

"Quadrilateral" from http://en.wikipedia.org/wiki/Quadrilateral, visited Jun. 17, 2011, 7 pages.

* cited by examiner

*Primary Examiner* — Vishal Patel
(74) *Attorney, Agent, or Firm* — Kinney & Lange, P.A.

(57) ABSTRACT

A seal assembly has a first seal member, a second seal member, and a third seal member. The first seal member has a wear surface that contacts a first wall of the cavity at two sealing locations. The second seal member has a wear surface that contacts a second wall of the cavity at two sealing locations. The third seal member extends between and resiliently connects the first seal member to the second seal member.

14 Claims, 4 Drawing Sheets

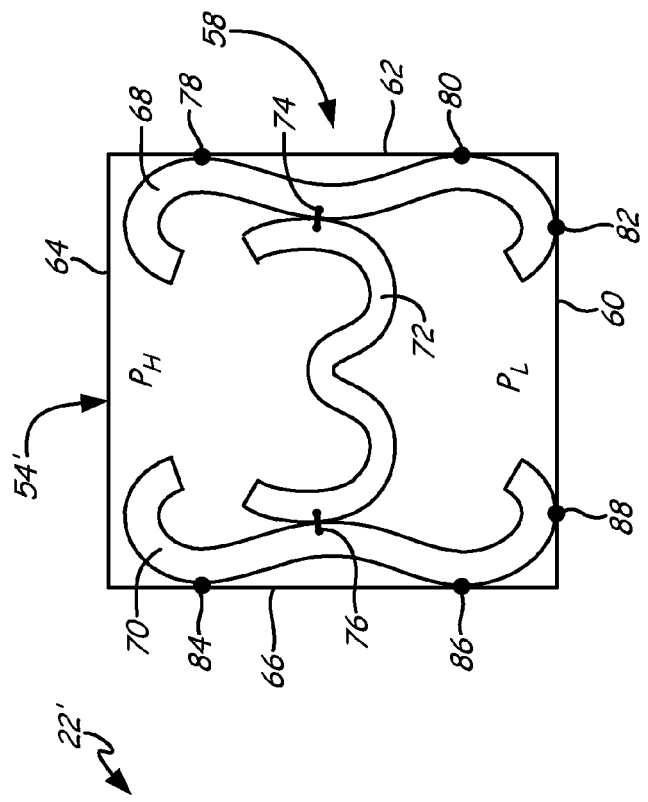
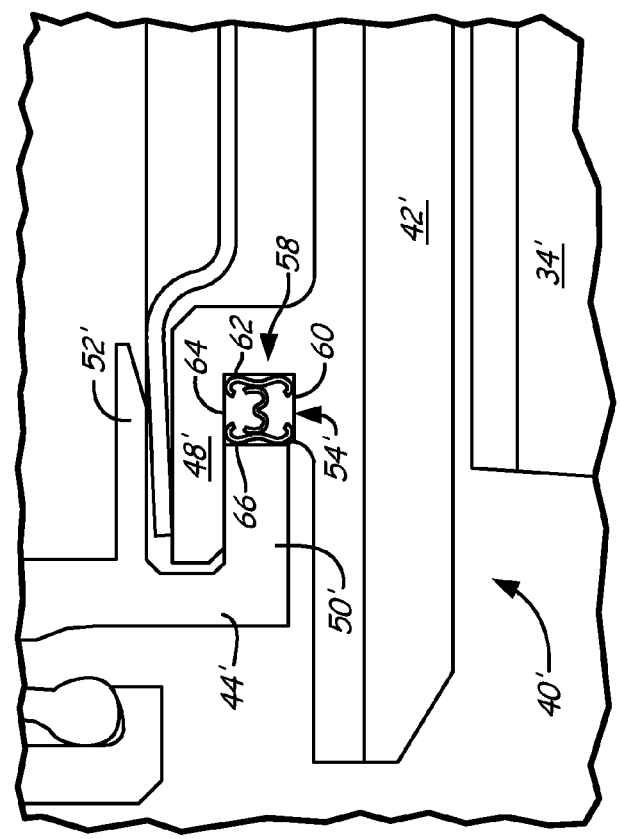

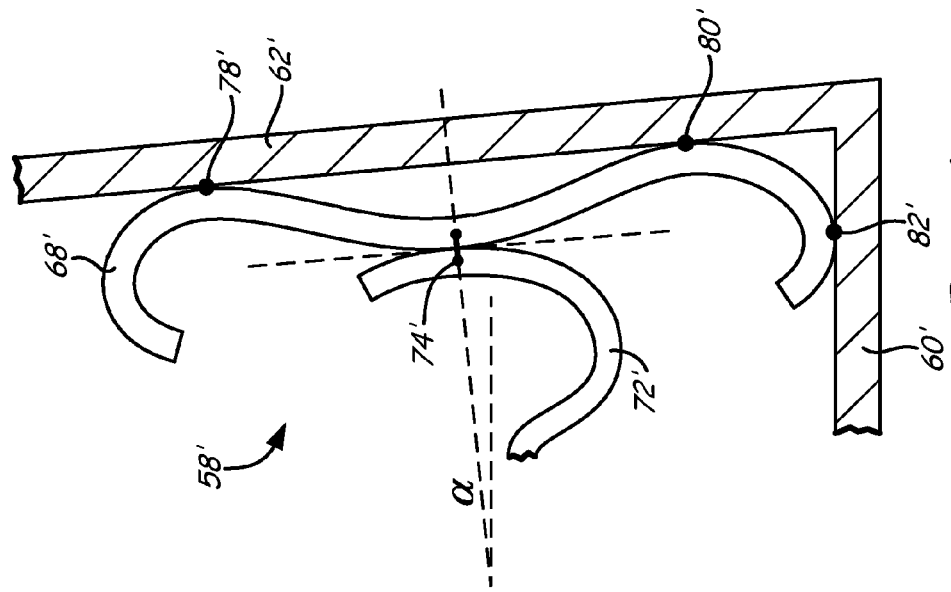
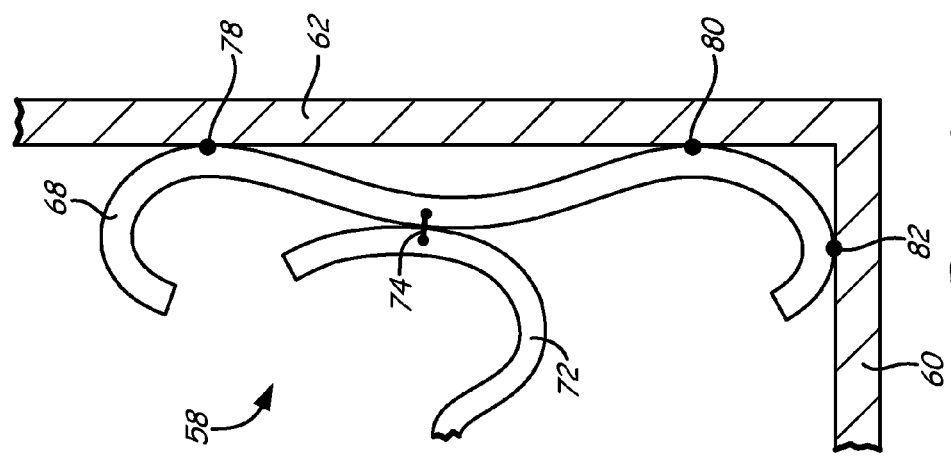

WINGED W-SEAL

BACKGROUND

The present disclosure relates generally to seals, and more specifically to W-seals for gas turbine engines.

Throughout a gas turbine engine, various types of seals are used for various purposes. Typical seal types are labyrinth, brush, leaf, and W-seals. Seal type is chosen based on its desired properties and application. Often seals are designed to prevent air leakage between components of the gas turbine engine. The extent to which a given seal accomplishes its purpose, otherwise known as "sealing efficiency", can affect gas turbine engine performance.

SUMMARY

A seal assembly for use in a gas turbine engine includes a first seal member, a second seal member, and a third seal member. The first seal member has an undulating wear surface that contacts a first wall of the cavity at a first inner sealing surface and a first outer sealing surface. The second seal member has an undulating wear surface that contacts a second wall of the cavity at a second inner sealing surface and a second outer sealing surface, and attached to the first seal member at a first joint located between the first inner sealing surface and the first outer sealing surface. The third seal member is attached to the second seal member at a second joint located between the second inner sealing surface and the second outer sealing surface, such that the third seal member forms a resilient connection between the first seal member and the second seal member.

A seal assembly has a first seal member, a second seal member, and a third seal member. The seal assembly is designed for use in a cavity having a first wall and second wall. The first seal member has a wear surface that contacts the first wall of the cavity at two sealing locations. The second seal member has a wear surface that contacts the second wall of the cavity at two sealing locations. The third seal member extends between and resiliently connects the first seal member to the second seal member without contacting any wall of the cavity.

A method of sealing a cavity in a gas turbine engine includes attaching a first seal member to a second seal member with a third seal member. The method further includes contacting a first wall of the cavity at two sealing surfaces with the first sealing member, and contacting a second wall of the cavity at two sealing surfaces with the second sealing member.

BRIEF DESCRIPTION OF THE DRAWINGS

FIG. 3 is a cross sectional view of a winged W-seal in a low pressure turbine in accordance with the present disclosure.

FIG. 4 is a cross sectional view of the winged W-seal with the remaining components of the low pressure turbine from FIG. 3 removed.

FIG. 5 is an enlarged, partial cross sectional view of the winged W-seal from FIG. 4.

FIG. 6 is a partial cross sectional view of an alternative embodiment of the winged W-seal.

DETAILED DESCRIPTION

Figure 1:
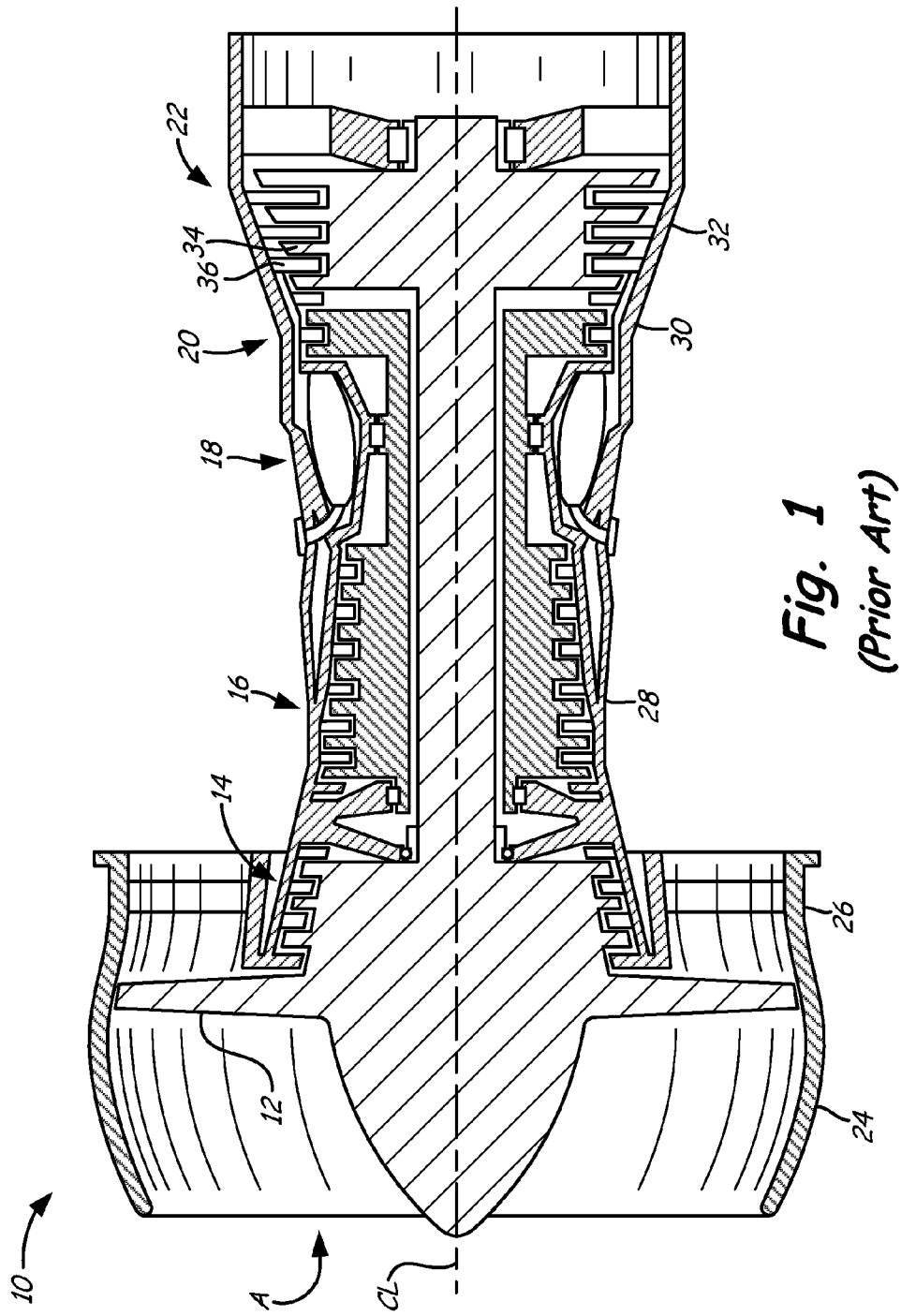
FIG. 1 is a cross sectional view of a gas turbine engine in accordance with the prior art.

FIG. 1 is a cross sectional view of gas turbine engine 10 in accordance with the prior art. Gas turbine engine 10 includes fan 12, low pressure compressor (LPC) 14, high pressure compressor (HPC) 16, combustor 18, high pressure turbine (HPT) 20, and low pressure turbine (LPT) 22, which are each concentrically disposed around longitudinal engine centerline CL. Fan 12 is enclosed at its outer diameter within fan case 24. Likewise, the other engine components are enclosed at their outer diameters within various engine casings, including LPC case 26, HPC case 28, HPT case 30, and LPT case 32. LPT 22 further includes blades 34 and vanes 36.

As shown in FIG. 1, fan 12, LPC 14, HPC 16, combustor 18, HPT 20, and LPT 22 are located in flow series within gas turbine engine 10. Ambient air A enters fan 12, is directed first into LPC 14, and then into HPC 16. LPC 14 and HPC 16 work together to increase pressure of ambient air A, thereby forming compressed air. The compressed air is delivered to combustor 18, mixed with fuel, and burned to produce high energy combustion gases or "working gases". Within HPT 20 and LPT 22, working gases are expanded as they pass along alternating rows of blades 34 and vanes 36. The expansion of working gases produces power for HPC 16 and LPC 14, as well as usable work, such as thrust for an aircraft.

Figure 2:
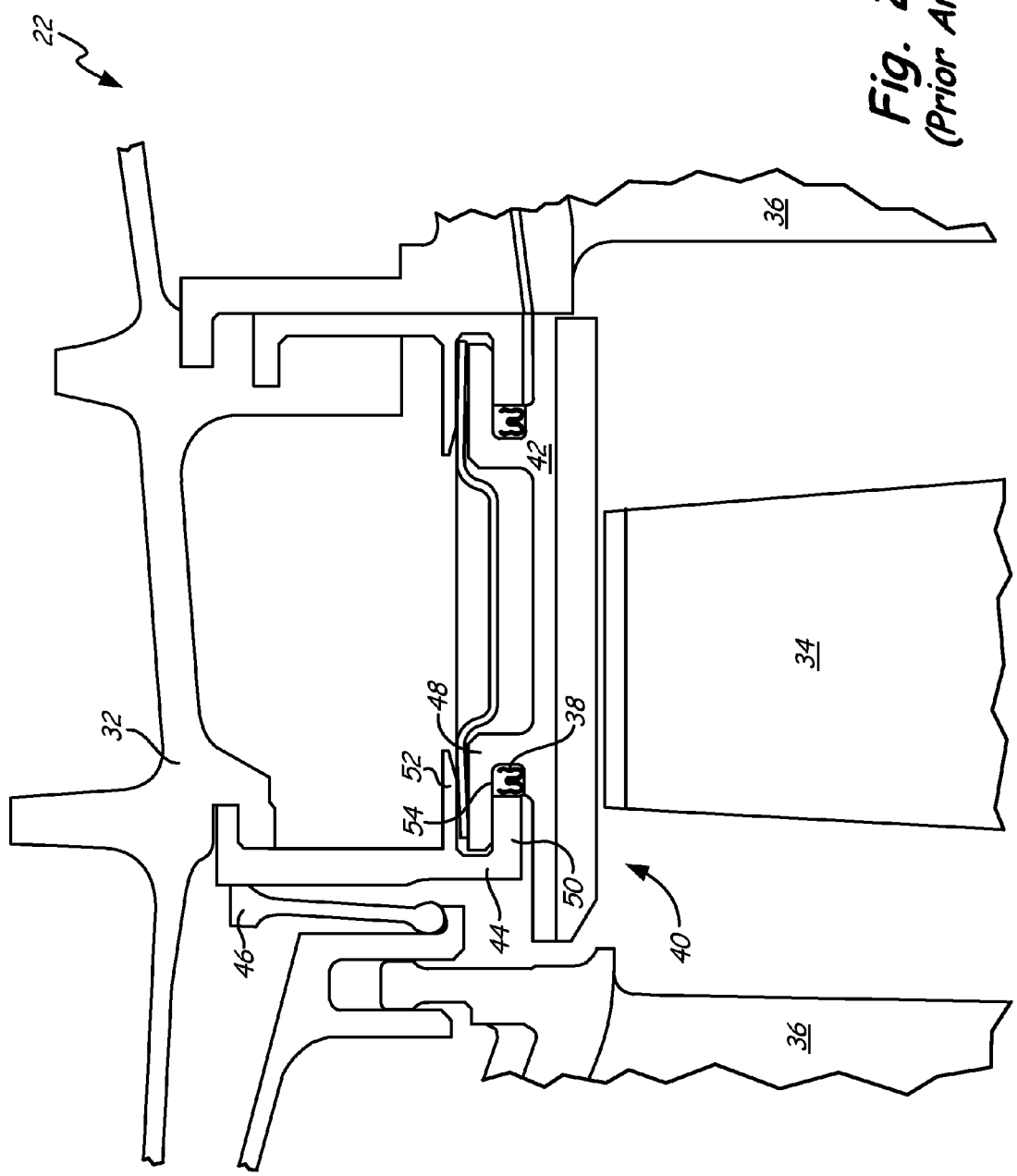
FIG. 2 is a cross sectional view of typical W-seals in a low pressure turbine from the gas turbine engine of FIG. 1.

FIG. 2 is a cross sectional view of typical W-seals 38 in low pressure turbine (LPT) 22 from FIG. 1. Typical W-seals 38 are located throughout engine 10 (e.g. HPT 20, HPC 16, etc.). Depicted in FIG. 2 are LPT 22, LPT casing 32, blade 34, vanes 36, two W-seals 38, and shroud assembly 40. Shroud assembly 40 includes blade outer air seal (BOAS) 42, blade outer air seal (BOAS) supports 44, and various other seals, such as dogbone seal 46. BOAS 42 has hooks 48, and BOAS supports 44 have cooperating hooks 50, 52, which mate and form cavities 54. W-seals 38 are located in cavities 54.

LPT 22 is contained at its radially outward circumference by LPT casing 32. LPT 22 includes a series of alternating rotating blades 34 and stationary vanes 36. The radially outermost portion of blade 34 is located in close proximity to LPT casing 32. Located radially inward from LPT casing 32, and radially outward from blade 34, are W-seals 38 and shroud assembly 40. For the sake of brevity, only the upstream W-seal 38 and surrounding portions of BOAS 42 and upstream BOAS support 44 are described in detail, but it should be appreciated that more a downstream W-seal is also associated with shroud assembly 40.

Shroud assembly 40 includes BOAS 42, BOAS supports 44, and various other seals (removed for clarity) including dogbone seal 46. BOAS 42 and BOAS supports 44 are mounted by cooperating hooks. First hook 48 extends upstream from a radially outermost portion of BOAS 42. Second hook 50 extends downstream from a radially innermost portion of upstream BOAS support 40, and third hook 52 extends downstream from upstream BOAS support 40, just radially outward from second hook 50. Accordingly, first hook 48 of BOAS 42 mates between second hook 50 and third hook 52 of BOAS support 44. Hook 48 can be a full-circumference rail or two or more individual hooks. Cavity 54 is formed between BOAS 42 and BOAS support 44. More specifically, a radially inward surface of cavity 54 is bordered by BOAS 44, a downstream surface and a radially outermost surface of cavity 54 are bordered by first hook 48 of BOAS 44, and an upstream surface of cavity is bordered by second hook 50 of BOAS support 44. W-seal 38 is contained within cavity 54 to prevent air leakage between the components of shroud assembly 40.

As described above with reference to FIG. 1, working gases pass along alternating rows of blades 34 and vanes 36 in LPT 22 to be expanded. Since shroud assembly 40 is located between LPT casing 32 and blade 34, it is subjected to pressure gradients, temperature gradients, and vibrations. BOAS 42 and BOAS supports 44 move axially relative to each other as the engine heats up. A plurality of seals are associated with shroud assembly 40, such as W-seal 38, which is positioned within cavity 54 to restrict mass flow of air between BOAS 42 and BOAS support 44. The sealing surfaces of W-seal 38 degrade overtime due to wear, vibration, abrasion, and heat. Eventually, the sealing surfaces can fracture and cause fluid leaks, which compromises engine performance.

FIG. 3 is a cross sectional view of winged W-seal 58 in low pressure turbine (LPT) 22' in accordance with the present disclosure. LPT 22' is used for descriptive purposes, but it should be appreciated that winged W-seal 58 can be located in any potion of a gas turbine engine. FIG. 4 is a cross sectional view of winged W-seal 58 in cavity 54' with the rest of LPT 22' removed for simplicity. Depicted in FIG. 3 are LPT 22', blade 34', shroud assembly 40', blade outer air seal (BOAS) 42', blade outer air seal (BOAS) support 44', hooks 48', 50', 52', cavity 54', and winged W-seal 58. Shown in both FIGS. 3 and 4 are walls of cavity 54': inner wall 60, downstream wall 62, outer wall 64, and upstream wall 66. FIG. 4 further depicts the subcomponents of winged W-seal 58: downstream wing 68, upstream wing 70, spring 72, first joint or weld 74, and second joint or weld 76. Winged W-seal 58 contacts cavity 54' at four to six sealing surfaces 78-84 to prolong the life of winged W-seal 58.

Portions of LPT 22' are similar to LPT 22 described above with reference to FIG. 2, and like reference numerals designate like components. Like typical W-seal 38, winged W-seal 58 is contained within annular cavity 54'. In the depicted embodiment, cavity 54' is quadrilateral and defined by four walls: inner wall 60, downstream wall 62, outer wall 64, and upstream wall 66. In other embodiments, outer wall 62 may be absent. Inner wall 60 is bordered by BOAS 42', downstream wall 62 and outer wall 64 are bordered by hook 48' of BOAS 42', and upstream wall 66 is bordered by hook 50' of BOAS support 44'. In the depicted embodiment, inner wall 60 is parallel to outer wall 64 and downstream wall 62 is parallel to upstream wall 66, such that the cavity 54' is rectangular and has four perpendicular angles, although the invention is not so limited.

Winged W-seal 58 can be either full hoop or split hoop and is formed from three sealing members: upstream wing 68 (a first sealing member), downstream wing 70 (a second sealing member), and spring 72 (a third sealing member). Upstream wing 68 and downstream wing 70 are mirror images of one another and each have undulating sealing surfaces that face and contact the axial walls of cavity 54'. The radially outermost portions of wings 68, 70, which are adjacent outer wall 64, curve inwardly toward inner wall 60. Similarly, the radially innermost potions of wings 68, 70, which are adjacent inner wall 60, curve outwardly toward outer wall 64. Between the innermost and outermost portions, wings 68, 70 undulate or have a serpentine structure. Upstream wing 68 is attached to downstream wing 70 by central spring 72, which may contact wings 68, 70 in additional locations. Spring 72 also undulates and its structure resembles the typical W-seal (reference numeral 38 in FIG. 2). In contrast to typical W-seal 38, spring 72 does not contact any wall of cavity 54'. A downstream side of spring 72 is attached to an approximate center of downstream wing 68 at first weld 74. An upstream side of spring 72 is attached to an approximate center of upstream wing 70 at second weld 76. In the depicted embodiment, first weld 74 and second weld 76 lie in the same plane.

Downstream wing 68 forms two or more sealing surfaces with cavity 54': first sealing surface 78, second sealing surface 80, and, in some instances (e.g. a cold state), third sealing surface 82. Downstream wing 68 has first sealing surface 78 at a radially outer potion of downstream wall 62 and second sealing surface 70 at a radially inner portion of downstream wall 62. Between first sealing surface 78 and second sealing surface 80, downstream wing 68 curves in the upstream direction and attaches to spring 72 at first weld 74. As downstream wing 68 extends radially outward toward outer wall from first sealing surface 78, downstream wing 68 curves upstream and turns radially inward toward center spring 72. As downstream wing 68 extends radially inward from second sealing surface 80, downstream wing 68 may or may not contact inner wall 60 to form third sealing surface 82. From the optional third sealing surface 80, downstream wing 68 curves upstream and back toward center spring 72.

Upstream wing 70 forms at least two sealing surfaces with cavity 54': fourth sealing surface 84, fifth sealing surface 86, and, in some instances (e.g. a cold state), sixth sealing surface 88. Upstream wing 70 has fourth sealing surface 84 at a radially outer potion of upstream wall 66 and fifth sealing surface 86 at a radially inner portion of upstream wall 66. Between third sealing surface 84 and fourth sealing surface 86, upstream wing 70 curves in a downstream direction and attaches to spring 72 at second weld 76. As upstream wing 70 extends radially outward toward outer wall 64 from fourth sealing surface 84, upstream wing 70 curves downstream and turns radially inward toward center spring 72. As upstream wing 70 extends radially inward from fifth sealing surface 86, upstream wing 70 may contact inner wall 60 and form sixth sealing surface 88. From optional sixth sealing surface 88, upstream wing 70 curves downstream and back toward center spring 72. First sealing surface 78 and fourth sealing surface 84 lie in the same plane, and second sealing surface 80 and fifth sealing surface 86 lie in the same plane. Further, winged w-seal 58 has bilateral symmetry about a plane parallel to downstream wall 62 and upstream wall 64 that intersects a center of spring 72.

During engine operation, high pressure $P_H$ air passes by outer wall 64 of cavity 54' and low pressure $P_L$ air passes by inner wall 60 of cavity 54'. Winged W-seal 58 is designed to maintain the pressure gradient between high pressure $P_H$ air and low pressure $P_L$ air by sealing cavity 54'. Since BOAS 42 and BOAS support 44 move axially relative to each other as the engine heats up and things grow thermally at different rates, W-seal 38 should be flexible enough axially to expand and seal against the axial walls of cavity 54'. Downstream wing 68 forms two sealing surfaces (78, 80) with downstream wall 62 and, optionally, one sealing surface (82) with inner wall 60. Upstream wing 70 forms two sealing surfaces (84, 86) with upstream wall 66, and, optionally, one sealing surface (88) with inner wall 60. No portion of winged W-seal 58 contacts outer wall 64, and spring 72 does not contact any wall of cavity 54'.

While all of winged W-seal 58 can be formed from metal, the components of winged W-seal 58 need not be uniform in material or thickness. For example, downstream wing 68 and upstream wing 70 could be formed from a thicker (e.g. 20 mils), more wear-resistant metal, while spring 72 could be formed of a thinner (e.g. 10 mils), more resilient metal. The curvature at the innermost and outermost portions of both upstream wing 68 and downstream wing 70 are designed to contain spring 72 in the event of a fracture, thereby decreasing the probability for domestic object damage (DOD). The thermal load of the sealing surfaces is concentrated in wings 68, 70, and therefore, separated from the resiliency and axial deflection of spring 72. Further, the additional sealing surfaces provided by wings 68, 70 result in improved sealing efficiency and superior wear tolerance for winged W-seal 58 in comparison to prior art W-seal (such as w-seal 38 of FIG. 2)

FIG. 5 is an enlarged, partial cross sectional view of winged W-seal 58, and FIG. 6 is a partial cross sectional view of an alternative embodiment of winged W-seal 58'. Depicted in FIG. 5 are winged W-seal 58, inner wall 60, downstream wall 62, downstream wing 68, spring 72, first weld 74, first sealing surface 78, second sealing surface 80, and third sealing surface 82. Depicted in FIG. 6 are winged W-seal 58', inner wall 60', downstream wall 62', downstream wing 68', spring 72', first weld 74', first sealing surface 78', second sealing surface 80', and third sealing surface 82'. FIGS. 5 and 6 show optional relocation of first weld 74' to compensate for tapering of upstream wall 62'.

In FIG. 5, first weld 74 is located approximately halfway between first sealing surface 78 and second sealing surface 80, as described above with respect to FIGS. 3 and 4. The central location of first weld 74 is determined, at least in part, by the fact that downstream wall 62 is perpendicular to inner wall 60. In other instances, downstream wall 62 can be tapered, either upstream or downstream. FIG. 6 shows an alternative embodiment of winged W-seal 58' useful for instances where downstream wall 62' tapers upstream from its attachment to inner wall 60' (i.e. forms an angle of less than 90°).

Winged W-seal 58' is similar to winged W-seal 58 described above and like numerals indicate like components. The main difference between winged W-seal 58' from FIG. 6 and winged W-seal 58 from FIG. 5 is the location of first welds 74', 74. Instead of being centrally located, first weld 74' of winged W-seal 58' is positioned closer to first sealing surface 78' than second sealing surface 80' of downstream wing 68'. In FIG. 6, the original location of first weld 74 from winged W-seal 58 is shown in a dotted line and transferred radially outward along downstream wing 68' a distance shown as alpha to the new location of first weld 74'. This outward movement of first weld 74' can be used to control deflection from taper of downstream wall 62' and/or force at sealing surfaces 78' and 80'. For example, the alteration of first weld 74' location could force second sealing surface 80' to make contact with downstream wall 62' before first sealing surface 78' contacts downstream wall 62'. This principle is also applicable in the opposite direction. If downstream wall 62' tapered downstream form its attachment to inner wall 60' (i.e. formed an angle greater than 90°), first weld 74' could be repositioned radially inwardly along downstream wing 68' to a location closer to second sealing surface 80' than first sealing surface 78'. Thus, the location of welds can be selected to minimize stress on the joint, as well as bias sealing surfaces for a variety of cavity configurations.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly for use in a cavity of a gas turbine engine, the cavity having a first wall, a second wall and a third wall, the seal assembly comprising:
  a first seal member having an undulating wear surface that contacts the first wall of the cavity at a first inner sealing surface and a first outer sealing surface, and the third wall of the cavity at a third sealing surface;
  a second seal member having an undulating wear surface that contacts the second wall of the cavity at a second inner sealing surface and a second outer sealing surface, and the third wall of the cavity at a fourth sealing surface; and
  a third seal member attached to the first seal member at a first joint located between the first inner sealing surface and the first outer sealing surface, and attached to the second seal member at a second joint located between the second inner sealing surface and the second outer sealing surface, such that the third seal member forms a resilient connection between the first seal member and the second seal member, wherein the first seal member and the second seal member are both thicker than the third seal member.

2. The seal assembly of claim 1, wherein the seal assembly is annular.

3. The seal assembly of claim 1, wherein the first joint location is positioned to control contact pressure at the first inner sealing surface and the first outer sealing surface of the first seal member.

4. The seal assembly of claim 1, wherein the third seal member, the first joint, and the second joint define an internal chamber having a first pressure and an external chamber having a second pressure.

5. A seal assembly for a cavity having a first axial wall, a second axial wall and a third wall, the seal assembly comprising:
  a first seal member having a wear surface that contacts the first axial wall of the cavity at two sealing locations, wherein the first seal member further contacts the third wall of the cavity at a third sealing location;
  a second seal member having a wear surface that contacts the second axial wall of the cavity at two sealing locations, wherein the second seal member further contacts the third wall of the cavity at a fourth location; and
  a third seal member extending between and resiliently connecting the first seal member to the second seal member without contacting any wall of the cavity, wherein the third seal member has a wavy configuration and comprises a metallic material.

6. The seal assembly of claim 5, wherein the first sealing member has a first inner sealing surface and a first outer sealing surface along the first axial wall, and the second sealing member has a second inner sealing surface and second outer sealing surface along the second axial wall.

7. The seal assembly of claim 6, wherein the first inner sealing surface and the second inner sealing surface are in a first plane, and the second inner sealing surface and the second outer sealing surface are in a second plane.

8. The seal assembly of claim 7, wherein the third seal member is attached to the first seal member at a first joint, the first joint located between the first inner sealing surface and the first outer sealing surface, and the third seal member is attached to the second seal member at a second joint, the second joint located between the second inner sealing surface and the second outer sealing surface.

9. The seal assembly of claim 8, wherein the first joint and the second joint are in a third plane.

10. The seal assembly of claim 9, wherein the seal assembly has bilateral symmetry about a fourth plane that interests a center of the third seal member.

11. The seal assembly of claim 5, wherein the first axial wall and the third wall of the cavity are perpendicular to one another.

12. A method of sealing a cavity in a gas turbine engine, the cavity including a first wall, a second wall and a third wall, the method comprising:

attaching a first seal member to a second seal member with a third seal member, the third sealing member having an undulating configuration and comprising a metallic material;

contacting the cavity at three or more sealing surfaces with the first sealing member, wherein at least two of the sealing surfaces of the first sealing member contact the first wall of the cavity and a third of the sealing surfaces of the first sealing member contacts the third wall of the cavity; and contacting a second wall of the cavity at three or more sealing surfaces with the second sealing member, wherein at least two of the sealing surfaces of the second sealing member contact the first wall of the cavity and a third of the sealing surfaces of the second sealing member contacts the third wall of the cavity.

13. The method of claim 12, wherein attaching the first seal member to the second seal member with the third sealing member includes:

forming a first joint between the third seal member and the first seal member; and forming a second joint between the third seal member and the second seal member.

14. The method of claim 13, wherein the first joint is located between the two sealing surfaces on the first sealing member, and the second joint is located between the two sealing surfaces on the second sealing member.

* * * * *